United States Patent Office 2,704,256
Patented Mar. 15, 1955

2,704,256

BEVERAGE COMPOSITION AND PROCESS FOR PRODUCING SAME

Rose A. Weiss, Miami Beach, Fla.

No Drawing. Application September 4, 1953, Serial No. 378,670

3 Claims. (Cl. 99—78)

My invention relates to a composition and a process for producing said composition and is more particularly directed to a product which when mixed with water will produce an effervescent and palatable nonalcoholic beverage similar to those presently manufactured, bottled and sold in liquid form.

Therefore, a principal object of my invention is the production of an effervescent beverage which is packaged and sold in the granular or tablet form.

A further object of the present invention is to produce the above described product which when mixed with water forms a palatable effervescent nonalcoholic beverage.

A still further object of the present invention is the provision of a composition characterized as above which is itself inexpensive in its cost of manufacture and which composition eliminates the need for bottles and the attendant bottling operation thereby reducing to a minimum the cost price of the beverage to the consumer.

A still further object of the present invention is to provide a composition for producing an effervescent beverage which requires an infinitesimal part of the storage space required by that of the liquid beverage which is produced by the composition upon the addition of water, the latter space being that taken up by the presently bottled beverages.

With these and other objects in view as will appear hereinafter, my invention consists of certain combinations as will be hereinafter described in detail and particularly set forth in the appended claims.

In producing my composition, and in accordance with experimentation, it has been found that the best results are produced when the process thereof is carried out in three consecutive steps described in detail as follows:

*Step No. 1*

To approximately 8 parts of alcohol there are added 14.4 parts of oil cassia, 1.7 parts of oil myristica and 19.2 parts of pure vanilla extract having 37% alcohol content. These ingredients are mixed thoroughly and permitted to age for a period of approximately one week, at which time they will become thoroughly blended.

*Step No. 2*

Approximately 6.5 parts of citric acid are added to 18 parts of boiling distilled water. Then there are added 3 parts of caffeine. This caffeine citrate mixture is then permitted to cool to approximately 60 degrees centigrade. Approximately 9 parts of extract of chestnut leaves in solid form are taken and triturated in 12.5 parts of alcohol until complete solution is effected. Then 9 parts of water soluble kola nut extract are mixed with and triturated in 25 parts of glycerine and 25 parts of propylene glycol until a complete solution thereof is effected. Now, the aforementioned triturated extract mixtures are taken and mixted together and then mixed with the properly cooled caffeine citrate mixture. To this mixture there are then added 20 parts of phosphoric acid (85% sirupy), 80 parts of lime juice and 63 parts of the blended mixture obtained in Step No. 1. This mixture is then permitted to age for a period of approximately 10 days after which it is filtered under vacuum pressure and 30 parts of acid proof caramel coloring are then added thereto.

*Step No. 3*

To approximately 20 parts of sucrose (table sugar) there are added the following ingredients.

3 parts of the product derived in Step No. 2
2 parts of pure dried coffee in powder form
2 drops of angostura bitters
7.5 parts of pineapple juice concentrate (four to one)
.5 part of dried pure lemon powder
2 parts of dried powdered orange
1 part of dried lime powder
.2 part of dried pure ginger powder
1.5 parts of citric acid After the above indicated ingredients have been thoroughly mixed to form a homogeneous composition, any moisture present in the composition may then be dehydrated therefrom to form a dry crystalline composition.

The resulting composition which is then packaged along with 1.5 parts of potassium bicarbonate may be dissolved in a quantity of water to produce a palatable or effervescent beverage. If desired, the above indicated composition may be pressed into tablet form as is done to the potassium bicarbonate. Now, by first dissolving the composition in tablet form in water and then adding the tablet potassium bicarbonate, the resulting beverage will be identical to that produced by the powdered composition.

The quantities of the various ingredients described above and indicated as parts are intended to be by weight. These amounts are intended to be approximate only as minor variations of the indicated amounts, especially those ingredients added for flavor, will produce only minor variations in taste and palatability in the final product. Since there is no precise method of testing when the mixtures arrived at by Steps 1 and 2 have become completely blended, the time mentioned to effect a proper ageing of the mixtures is likewise approximate and can be varied depending upon the conditions under which the steps are taken.

It is proposed that the composition produced herein be packaged in granular form or pressed into a tablet. The potassium bicarbonate can be sold either separately packaged or in combination with the remainder of the composition. In the event the composition is packaged separately of the sodium bicarbonate, the composition is first dissolved in water and then the sodium bicarbonate is added to produce the effervescent necessary for nonalcoholic beverages, otherwise the composition including the sodium bicarbonate is mixed and dissolved in water to form a palatable and tasty effervescent beverage.

Having described my invention, what I claim as new is:

1. The process of producing a composition adapted to be mixed with water to form an effervescent beverage comprising the adding to 8 parts of alcohol, 14.4 parts of oil cassia, 1.7 parts of oil myristica and 19.2 parts of pure vanilla extract, mixing said ingredients and permitting said mixture to age for substantially one week to form a first portion, triturating 9 parts of chestnut leaves in 12.5 parts of alcohol, triturating 9 parts of extract of kola nut in a mixture of 25 parts of glycerine and 25 parts of propylene glycol, adding 18 parts of boiling distilled water to 6.5 parts of citric acid and 3 parts of caffeine, cooling said last aqueous mixture to approximately 60 degrees centrigrade, mixing said cooled aqueous mixture with said triturated chestnut leaves, said triturated extract of kola nut, 20 parts of phosphoric acid, 80 parts of lime juice, and said first named portion, permitting said mixture to age for substantially 10 days, filtering said aged mixture under vacuum pressure and adding thereto 30 parts of acidproof caramel coloring to form a second portion, adding to and mixing thoroughly with 20 parts of sugar, 2 parts of powdered coffee, 2 drops of angostura bitters, 7.5 parts of pineapple juice concentrate, .5 part of powdered lemon, 2 parts of powdered orange, 1 part of powdered lime, .2 part of powdered ginger, 1.5 parts of citric acid, 3 parts of said second portion and 1.5 parts of potassium bicarbonate.

2. A composition adapted to be mixed with water to form an effervescent beverage comprising 2 parts of powdered coffee, 2 drops of angostura bitters, 7.5 parts of concentrated pineapple juice, .5 part of powdered lemon, 2 parts of powdered orange, 1 part of powdered lime, .2 part of powdered ginger, 1.5 parts of citric acid, 20 parts of sucrose, 1.5 parts of potassium bicarbonate and 3 parts of a product aged for substantially 10 days, said product comprising 9 parts of chestnut leaf extract triturated in 12.5 parts of alcohol, 9 parts of kola nut extract triturated in 25 parts of each of glycerine and propylene glycol, 27.5 parts of caffeine citrate, 20 parts of phosphoric acid, 80 parts of lime juice, 30 parts of acid-proof caramel coloring, and 63 parts of a further product aged for substantially one week, said further product comprising 14.4 parts of oil cassia, 1.7 parts of myristica, 19.2 parts of vanilla extract and 8 parts of alcohol.

3. A composition adapted to be mixed with water to form an effervescent beverage comprising 1.5 parts of citric acid, 20 parts of sucrose, 1.5 parts of potassium bicarbonate and 3 parts of a product aged for substantially 10 days, said product comprising 9 parts of chestnut leave extract triturated in 12.5 parts of alcohol, 9 parts of kola nut extract triturated in 25 parts of each of glycerine and propylene glycol, 27.5 parts of caffeine citrate, 20 parts of phosphoric acid, 80 parts of lime juice, and 63 parts of a further product aged for substantially one week, said further product comprising 14.4 parts of oil cassia, 1.7 parts of oil myristica, 19.2 parts of vanilla extract and 8 parts of alcohol.

No references cited.